(12) United States Patent  
Hellesøy et al.

(10) Patent No.: US 12,433,262 B2
(45) Date of Patent: Oct. 7, 2025

(54) BUOYANT EGG-SHAPED FISH FARMING TANK

(71) Applicant: OVUM AS, Bergen (NO)

(72) Inventors: Åsmund Hellesøy, Blomsterdalen (NO); Cato Lyngøy, Hjelmås (NO)

(73) Assignee: OVUM AS, Bergen (NO)

( * ) Notice: Subject to any disclaimer, the term of this patent is extended or adjusted under 35 U.S.C. 154(b) by 152 days.

(21) Appl. No.: 18/268,008

(22) PCT Filed: Dec. 20, 2021

(86) PCT No.: PCT/NO2021/050274
§ 371 (c)(1),
(2) Date: Jun. 16, 2023

(87) PCT Pub. No.: WO2022/131930
PCT Pub. Date: Jun. 23, 2022

(65) Prior Publication Data
US 2024/0065236 A1    Feb. 29, 2024

(30) Foreign Application Priority Data

Dec. 19, 2020 (NO) ................................. 20201405

(51) Int. Cl.
*A01K 61/60* (2017.01)
(52) U.S. Cl.
CPC .................................... *A01K 61/60* (2017.01)
(58) Field of Classification Search
CPC .......... A01K 61/60; A01K 61/10; A01K 63/04
USPC ....................................... 119/200, 223, 215
See application file for complete search history.

(56) References Cited

U.S. PATENT DOCUMENTS

| 790,046 A | 5/1905 | Gildea |
| 3,888,210 A * | 6/1975 | Buss ............... A01K 61/00 |
| | | 210/167.26 |
| 4,224,891 A | 9/1980 | Rinaldi |

(Continued)

FOREIGN PATENT DOCUMENTS

| CA | 1075092 A | 4/1980 |
| CL | 45462 B1 | 10/2002 |

(Continued)

OTHER PUBLICATIONS

International Preliminary Report on Patentability, issued in PCT/NO2021/050274, completed Dec. 15, 2022.

(Continued)

*Primary Examiner* — Zoe Tam Tran
(74) *Attorney, Agent, or Firm* — Alix, Yale & Ristas, LLP

(57) ABSTRACT

A buoyant, substantially egg-shaped fish farming tank with a shell with an internal farming volume, includes a substantially vertical main axis of the egg-shaped shell in the fish farming tank's operative, filled condition, the shell's blunter end being directed downwards, while the more tapered end is directed upwards, one or more inlets from the ambient seawater to the farming volume through a lower portion of the blunter end of the shell, and pumps arranged in proximity of outlets which are in proximity of the water surface of the ambient seawater, the outlets lead back to the ambient seawater, wherein the pumps are arranged to evacuate water from the farming volume.

23 Claims, 4 Drawing Sheets

(56) References Cited

U.S. PATENT DOCUMENTS

Figure 3:
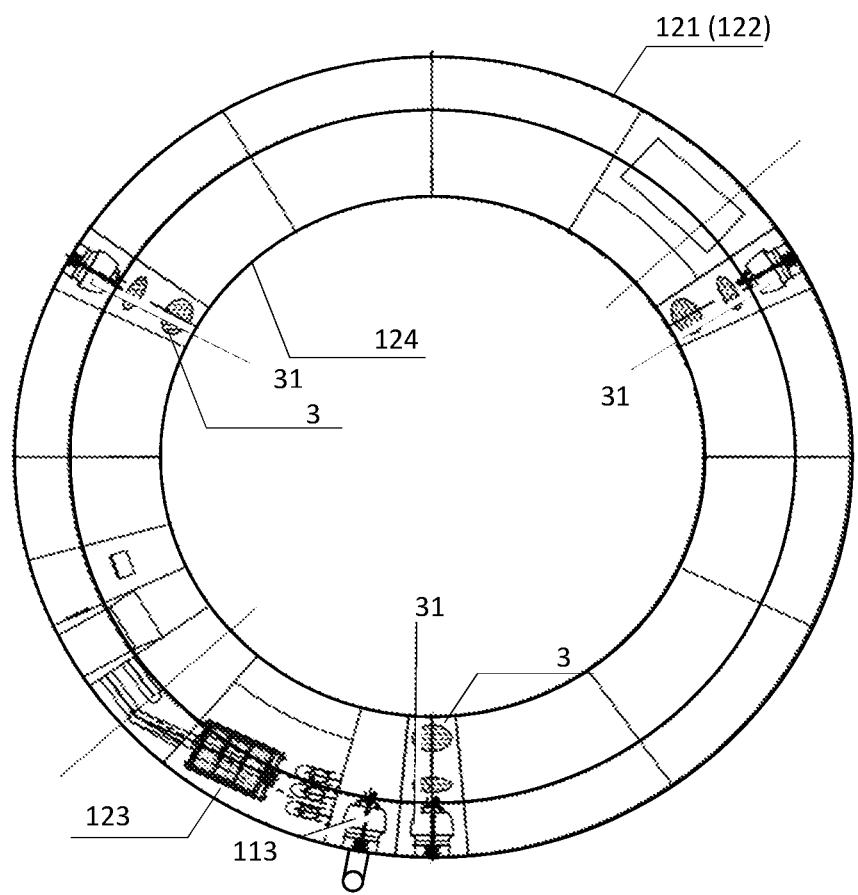

| | | | | |
|---|---|---|---|---|
| 4,244,323 | A | * | 1/1981 | Morimura ............. A01K 61/60 |
| | | | | 119/223 |
| 4,798,168 | A | * | 1/1989 | Vadseth ................ A01K 61/60 |
| | | | | 119/223 |
| 5,636,595 | A | * | 6/1997 | Lunde ................... A01K 63/04 |
| | | | | 119/224 |
| 6,443,100 | B1 | | 9/2002 | Brenton |
| 6,582,612 | B1 | | 6/2003 | White et al. |
| 10,206,376 | B1 | | 2/2019 | Lyngoy |
| 11,261,105 | B1 | | 3/2022 | Fesi |
| 11,445,708 | B2 | | 9/2022 | Gustavsen et al. |
| 2004/0023571 | A1 | * | 2/2004 | Warriner ................ B63B 1/047 |
| | | | | 441/40 |
| 2005/0284353 | A1 | | 12/2005 | Warnes |
| 2006/0162667 | A1 | * | 7/2006 | Papadoyianis ........ A01K 61/60 |
| | | | | 119/223 |
| 2006/0265940 | A1 | | 11/2006 | McAleer, Jr. et al. |
| 2009/0176303 | A1 | * | 7/2009 | Schlesinger ........... A01K 63/04 |
| | | | | 435/293.1 |
| 2010/0224136 | A1 | * | 9/2010 | Papadoyianis ........ A01K 61/60 |
| | | | | 119/223 |
| 2011/0174232 | A1 | | 7/2011 | Hoie |
| 2015/0150223 | A1 | | 6/2015 | Robinson |
| 2015/0342161 | A1 | * | 12/2015 | Sheriff ................ A01K 63/042 |
| | | | | 119/227 |
| 2016/0129979 | A1 | * | 5/2016 | Rossano ............. G21C 17/013 |
| | | | | 114/333 |
| 2019/0274289 | A1 | | 9/2019 | Leow |
| 2025/0000065 | A1 | | 1/2025 | Matre |
| 2025/0049003 | A1 | | 2/2025 | Matre |

FOREIGN PATENT DOCUMENTS

| | | |
|---|---|---|
| CL | 45306 B1 | 11/2002 |
| CL | 49494 B1 | 9/2011 |
| GB | 2031251 A | 4/1980 |
| JP | 57119287 A | 7/1982 |
| JP | 06276889 A | 10/1994 |
| JP | 2008220204 A | 9/2008 |
| NO | 343945 B1 | 7/2019 |
| NO | 20190766 A1 | 12/2020 |
| WO | WO 2010/016769 A1 | 2/2010 |
| WO | WO 2015/099540 A1 | 7/2015 |
| WO | WO 2017/026899 A1 | 2/2017 |
| WO | 2017179989 A1 | 10/2017 |
| WO | WO 2018/212666 A1 | 11/2018 |
| WO | 2018229123 A1 | 12/2018 |
| WO | WO 2019/035719 A1 | 2/2019 |
| WO | WO 2021/154087 A1 | 8/2021 |

OTHER PUBLICATIONS

International Search Report, issued in PCT/NO2021/050274, mailed Apr. 20, 2022.
Written Opinion of the International Searching Authority, issued in PCT/NO2021/050274, mailed Apr. 20, 2022.
Norwegian Search Report for Norwegian Application No. 20201405, dated Jul. 7, 2021, with English translation.
First Technical Examination dated May 14, 2024 for Danish Patent Application No. PA 2023 70302.
Office Action dated Apr. 30, 2025 for Japanese Patent Application No. 2023-537008.

* cited by examiner

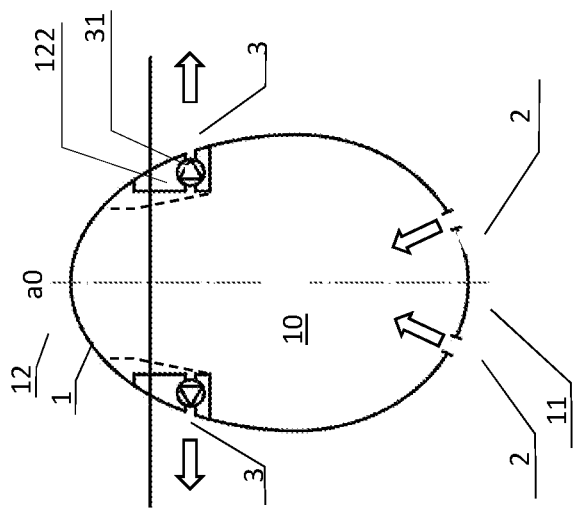
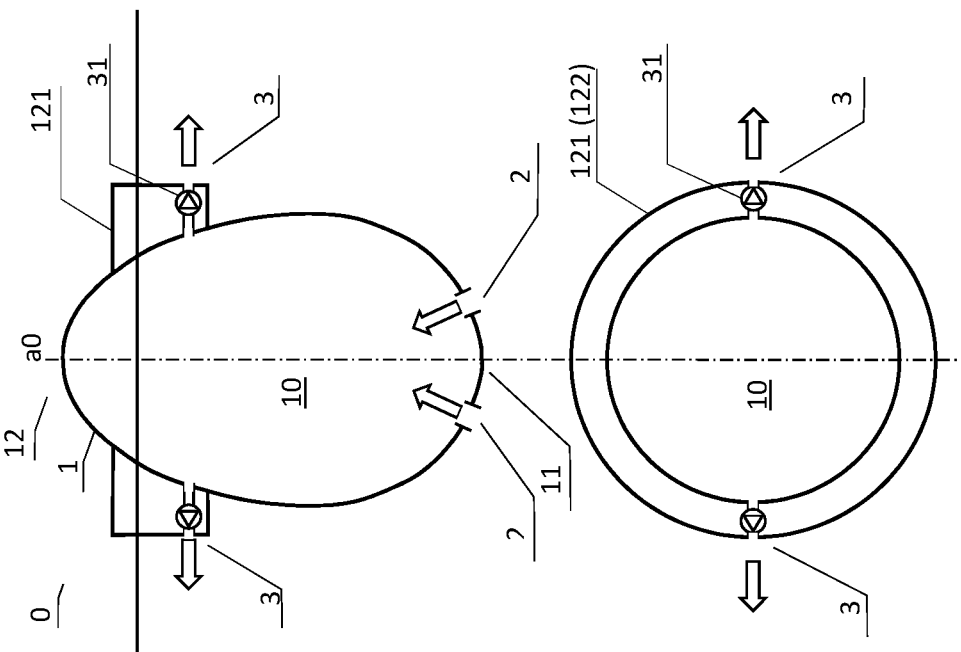

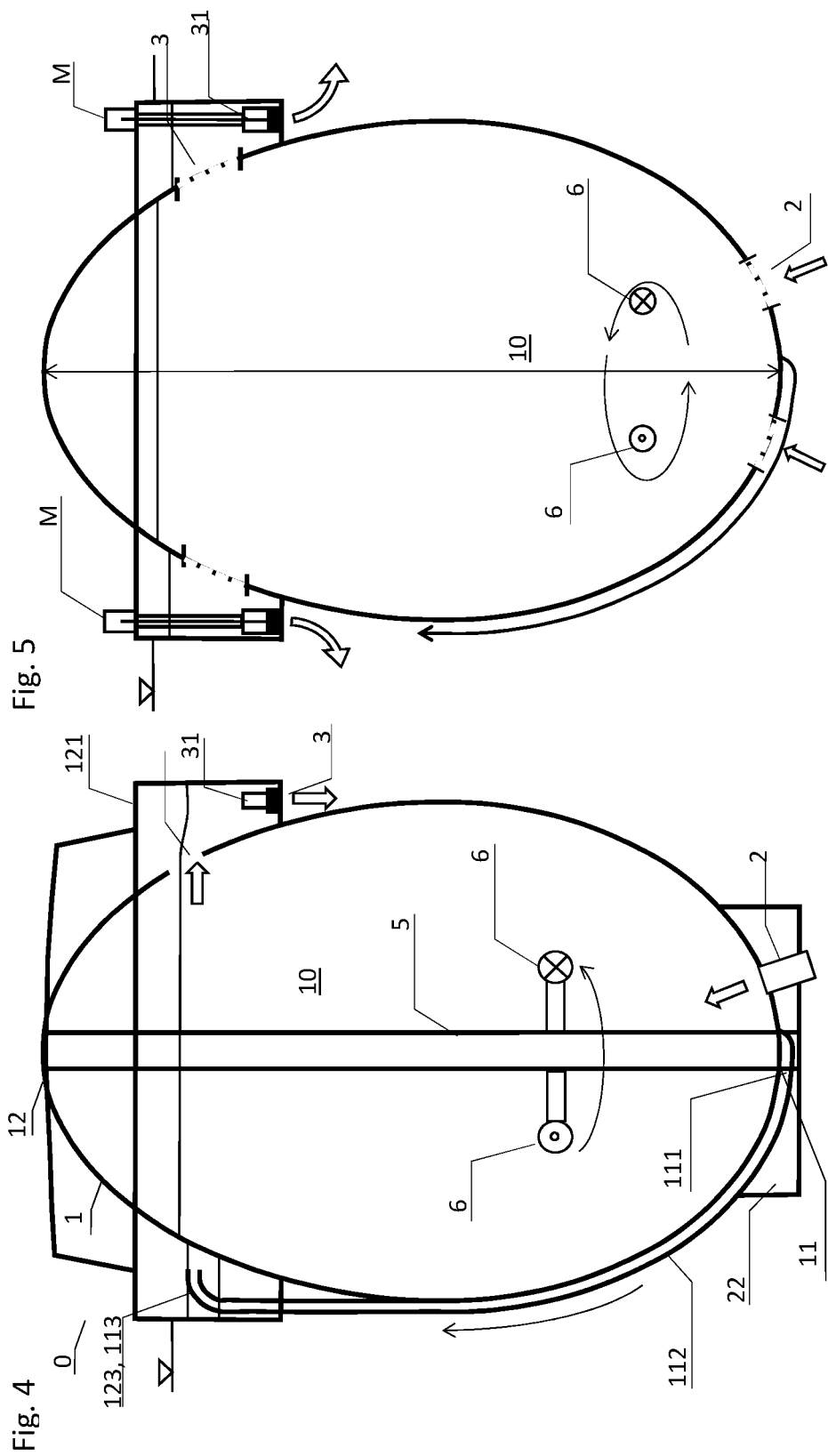

BUOYANT EGG-SHAPED FISH FARMING TANK

PREAMBLE

The present invention is a buoyant egg-shaped fish farming tank. More specifically, it is a mainly vertically aligned egg-shaped shell. In one embodiment, the fish farming tank is equipped with an external floating collar, or an internal, mainly annular buoyancy volume, and with passive lower inlets, and with suction pumps in upper outlets.

BACKGROUND TECHNIQUE

In the relevant specialized field, the following instances of closed fish farming tanks are prior arts.

WO2019035719 A1 with pumps placed in a lower position on the inlet pipes and outlets placed in an upper position near the water surface.

WO2017026899 A1 with inlets placed in a lower position and pumps on the inlet channels.

WO2010016769 A1 with a hemispherical shell-shaped concrete net cage which can be outfitted with a shell.

US2006265940 A1 is a tank of approx. 20 gallons for storage of bait.

Problem Description

Hauge Aqua possesses patents like D1 and D2 above, on egg-shaped tanks of a considerable size, where the tanks are provided with a center column stretching through the entire depth of the farming volume, and which comprise pumps, channels, and pipe guides. The center column may be useful in supporting of the actual shell construction, especially for tanks of a size of 20 000 m³ and above, but also for tanks less than 20 000 m³. The center column may be utilized for centering and as a path for sorting mechanisms moving along the center column, and it can also be utilized for internal pipe guides, e.g. of internal circulation, cleaning, and drainage of dead fish, and for intake of new water. The circulation pattern in these tanks is from the bottom and moving upwards, where the pumps pump in water to the farming volume down in the blunt ends, and consequently where the water surface inside the farming volume becomes slightly higher than the surrounding water line. This results in the water flowing out through ports and spillways by the inner surface and out to the water purifying plant in a floating collar before the cleaned water is exported. It is also required that the pumps deliver the water to the lower end of the egg's farming volume, either through the pumps being positioned deep under water by the inlets, or the pumps being positioned in shallow conditions and where the inlet water is lead deep down into the egg's farming volume, before being released down in the farming volume. In any case, this requires either deeply mounted pumps or extended piping, where in both instances, the pumps are positioned on the inlet side, pushing the water in front of itself, creating an overpressure inside the tank which requires a certain amount of energy.

BRIEF SUMMARY OF THE INVENTION

The present invention is an improvement over the prior art, and is defined in the enclosed claim. Subject matters but inventive features are included in the dependent patent claims.

A significant advantage with the invention is that no water is required to circulate to a significant degree in a tangential direction because no circular running drain chute in the external buoyancy collar (121) or in the internal annular buoyancy tank (122) is required; the inlet of the pumping plant can be directed relatively straight out; the purifying plant may have a short range. This is advantageous unless fish farming tanks like these are compared to prior art, where smaller tanks are to a larger degree subject to rolling/ramming. As such, the present model can withstand rolling to a larger degree. This tank as the present invention also requires less pumping energy because the water goes through fewer obstacles and the pressure drop is diminished vertical differences in water surface, internally and externally in the tank, become diminished it is not necessary to actively adjust the water surface vis-à-vis drain chute and filtration units, and as such that it operates with a somewhat lower water pressure and thus a lower energy consumption.

FIGURE EXPLANATION

FIG. 1 shows a principle drawing, a vertical section of an embodiment of the invention, where a buoyancy collar (121) has been provided on the tapered end of an egg-shaped shell, with outlets (3) with pumps (31) above right under the waterline, and with inlets (2) deep down below and relatively directly into the farming volume (10). Grates and possibly filters are provided to prevent passage of fish and small organisms.

FIG. 1B shows a principle drawing, a vertical section of another embodiment of the invention, where an internal buoyancy volume/buoyancy tanks (122) have been provided in the tapered end of an egg-shaped shell, with outlets (3) with pumps (31) above right under the waterline, and with inlets (2) deep down below and relatively directly into the farming volume (10). Grates and possibly filters are provided to prevent passage of fish and small organisms. In one embodiment of the invention, the internal annular volume of the buoyancy volume (122) is straight, cylindrically. In one embodiment of the invention, it is funnel-shaped and tapered in the upwards trajectory, either smooth as shown by the stippled line in FIG. 1B, or ladder-shaped.

FIG. 2 is a horizontal section of the tank in FIG. 1 by the outlets (3) and the pumps (31).

FIG. 3 is a cross-section and an outline horizontally through the buoyancy collar (121) and shows the outlets (3) with grates and pumps (31) and a purifying plant (123) in the buoyancy collar fed by a drainage pump (113) from a sump (111) at the bottom of the farming volume (10). Corresponding arrangement for outlets (3) and grates and pumps (31) and purifying plant (123) and drainage pump (113) may be arranged for an internal buoyancy volume/buoyancy tank (122). Note that the outlets happen via conventional grates and relatively directly out to the pumps; there, no oxidation channel between the outlets (3) are required. This increases the capacity of the buoyancy collar to the float tanks and purifying plant.

FIG. 4 is a vertical section through an embodiment of the invention's tank, where an outer drainage tube (112) is provided up form the sump (111) and up to the drainage pump (113), and a possible center column for stiffening, possibly also for pipe feeding, has also been drawn. These are in case one should desire to lead the drainage tube up through this instead of placing it in a possibly vulnerable position on the outside of the shell (1). This embodiment may for example be 21 meters high and contain one farming volume.

FIG. 5 illustrates the motors of the pumps (31) may be dry-pit. This is a significant advantage in regards to maintenance/repairs/replacement and for wiring. One or more fluid flow producers in the farming volume may also be provided.

Figure 6:
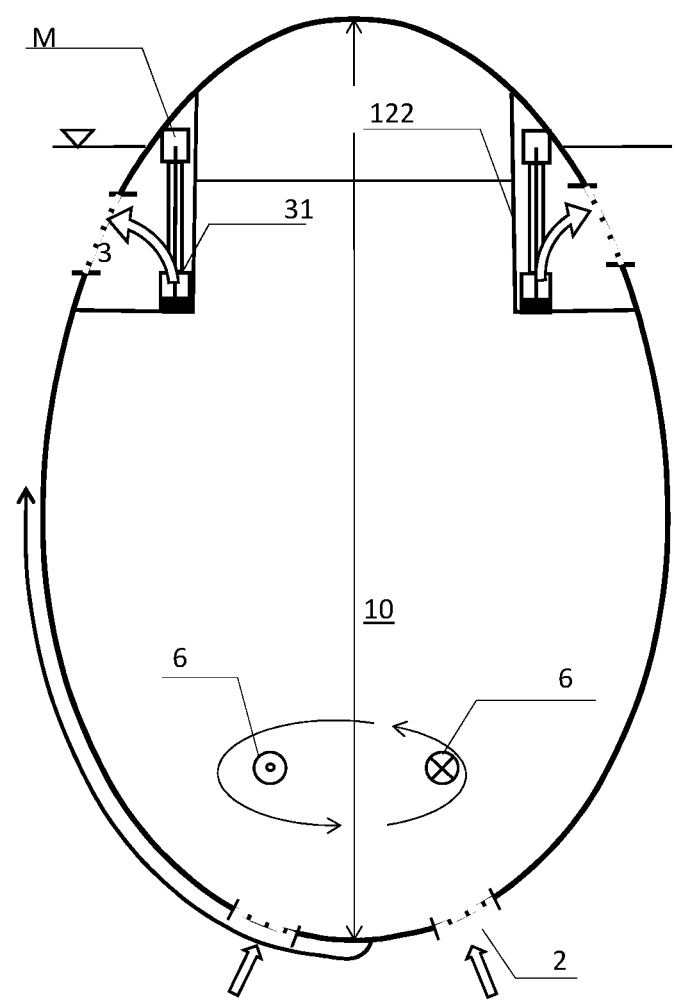

FIG. 6 illustrates that the motors and the pumps (31) in an embodiment of the invention are provided in the internal annular buoyancy volume (122). In one embodiment, the motors are dry-pit.

EMBODIMENTS OF THE INVENTION

Providing a buoyant, mainly egg-shaped fish farming tank (0) with a shell (1) with an internal farming volume (10) of between 2000 m$^3$ and 25 000 m$^3$, which comprises the following features:
- that a main axis (a0) of the egg-shaped shell (1) is mainly vertical in the farming tank's (1) operative, filled condition,
- that the shell's (1) blunt end (11) is directed downwards, while the tapering end (12) is directed upwards,
- that there is an inlet (2) from the ambient seawater through a portion of the lower, blunter end (11) of the shell,
- that there is an outlet (3) back to the ambient seawater in proximity of the waterline by the tapering end (12), preferably below the seawater surface, via pumps (31) arranged to lower the level of an inner seawater surface in the farming volume (10) inside the tank (0), and that seawater flows into the farming volume (10) through the inlets (2) below.

The fish farming tank (1) is arranged to be placed in the seawater with a high draft. In one embodiment, it is arranged to be placed with the water line between the top and ¼ of the total height of the fish farming tank (1). In a preferred embodiment, it is arranged to be placed with the water line higher than ⅙ of the total height.

In one embodiment of the invention, the suction pumps (31) are arranged to lower the level of an inner seawater surface inside the tank (0) in relation to the seawater surface of the ambient seawater.

The tank comes, in one embodiment, in a small-to-intermediate size, e.g. between 100 m$^3$ and 20 000 m$^3$, whereas in other embodiments, the tank is larger than 20 000 m$^3$ and upwards to 80 000 m$^3$.

There are a number of advantages with this invention: The upright, egg-shaped shell form with the narrower end up by the surface provides a lesser degree of vulnerability towards surface waves and thus a lesser degree of effects from slamming from the outside. The same internal form disperses internal waves more effectively than compared to a straight-walled tank of a corresponding volume, and possibly also for a corresponding, spherical volume. The fact that the pumps have been placed in an elevated position facilitates an easier access to the pumps, as well as a reduced risk of water penetration, which somewhat reduces the requirement of water tightness. An advantage of the invention in relation to the prior art is that we avoid pumping through elongated pipes, which results in a lesser degree of pressure drops and requires a lower degree of pumping energy.

In one embodiment, the fish farming tank according to the invention is equipped with straight inlets (2) which do not result in rotation in the water masses in the farming volume (10). In a preferable embodiment, the inlets (2) are partly or completely tangential and arranged to contribute to rotation of the water in the farming volume (10), at least in part of the inlet (2) which flows out on the inside of the farming volume (10).

In one embodiment of the invention, the fish farming tank is equipped with fluid flow generators (4) arranged to contribute with rotation of the water masses in the farming volume, either solely or in combination with partly or completely tangential inlets and/or partly or completely tangential outlets, to contribute to a necessary circulation of the water masses surrounding a vertical axis in the farming volume.

In one embodiment of the invention, the pumps (31) are provided in a buoyancy collar (121) and/or in an internal, annular buoyancy volume (122). The buoyancy collar (121) and/or the buoyancy volume (122) is in one embodiment separated into sections. In one embodiment of the invention, the buoyancy collar (121) and/or the buoyancy volume (122) is equipped with two or more buoyancy tanks subject to ballasting. In one embodiment of the invention, the buoyancy collar (121) and/or the buoyancy volume (122) is equipped with two or more fixed buoyancy tanks, which can be air-filled or solid foam-filled. The buoyancy collar and/or the buoyancy volume is in one preferred embodiment equipped with bulkhead sectors as shown in FIG. 3.

In one embodiment of the invention, an internal sump (111) is provided for particles and dead fish internally in proximity of the lower end (11) of the shell (1), and where the sump (111) is connected to a drainage tube or—channel (112), as well as a drainage pump (113) for a filter/purifying plant/separation grate (123) for dead fish, see FIG. 4 specifically.

In the embodiment shown in FIG. 4, the drainage tube (112) extends to a position in proximity of the seawater surface to the filter/purifying plant/separation (123). In one embodiment, the drainage tube (112) extends externally on the shell (1). In one embodiment, the filter/purifying plant/separation (123) is provided in the buoyancy collar (121), see FIG. 3. In one embodiment, the filter/purifying plant/separation (123) is provided in the internal, annular buoyancy volume (122).

In one embodiment of the invention, the outlets (3) are arranged directly radial, or vertical outlets (3) or a combination thereof, which do not contribute to a rotation of the water masses in the farming volume. However, an embodiment where the actual outlet from the farming volume may be arranged partly or completely tangential, which will as such contribute to a rotation of the water masses in the farming volume (10).

In one embodiment of the invention, the shell is equipped with a vertical center column (5) through the farming volume (10) inside the shell (1). This may stiffen the shell construction, especially upon large volumes, but may prove superfluous as stiffening in itself with intermediate to medium-sized shells. However, a center column (5) can also be arranged in tanks irrespective of the volume of the tank, because a center column may create a path for pipe guides or a stem for nozzles, alternatively a mechanical path for vertical movement of separation grates or displacement mechanisms.

In one embodiment of the invention, the tank is equipped with one or more fluid flow generators (6) arranged in the farming volume (10), and designed to create a master flow around a vertical axis in the shell (1). They may be mounted on the center column, or mounted in a manner which extends inwards from the shell.

In another embodiment of the invention in scenarios where a center column (5) is present, the drainage tube (112) may extend internally via the center column (5) and extend further out to the filter/purifying plant/separation (123) in the buoyancy collar (121), or the internal, annular buoyancy volume (122).

In one embodiment, ballast (22) may be arranged as a bottom layer or in bottom tanks in or under the bottom of the shell (1), with the one or more inlet (2) pipes through the ballast (22).

In one embodiment, the pumps (31) may be arranged as submerged pumps (31) in the buoyancy collar (121) or the internal, annular buoyancy volume (122).

In one embodiment of the invention, the pumps (31) may be arranged with dry-pit pump motors on or in the buoyancy collar (121) or in the internal, annular buoyancy volume (122).

In one embodiment of the invention, a water purifying/ $CO^2$ ventilation plant (124) is arranged for ventilation of the farming volume's seawater and oxygenation is arranged. Part recycling of main seawater flow (with $CO^2$ ventilation and the like).

The invention claimed is:

1. A buoyant, egg-shaped fish farming tank with a shell with an internal farming volume, comprising:
   a vertical main axis of the egg-shaped shell in an operative, filled condition of the fish farming tank, wherein a blunter end of the shell is directed downwards, while a more tapered end is directed upwards;
   one or more inlets from ambient seawater to a farming volume through a portion of a lower blunter end of the shell, said inlets being passive inlets without pumps; and
   pumps arranged in proximity of outlets, the outlets being in proximity of a water surface of the ambient seawater, the outlets leading back to the ambient seawater,
   wherein the pumps are arranged to suction water out from an upper part of the farming volume.

2. The fish farming tank according to claim 1, provided with straight inlets which do not provide rotation of the water masses in the farming volume.

3. The fish farming tank according to claim 1, provided with fluid flow generators arranged to contribute to rotation of the water masses in the farming volume.

4. The fish farming tank according to claim 1, wherein the pumps are arranged in a buoyancy collar.

5. The fish farming tank according to claim 1, wherein the pumps are arranged in an internal, annular buoyancy volume.

6. The fish farming tank according to claim 1, wherein an internal sump is arranged for particles and dead fish internally in lower portion proximity of the blunter end of the shell, and
   wherein the sump is connected to a drainage hose or channel, and a drainage pump to a filter/purifying plant/separation grate for dead fish.

7. The fish farming tank according to claim 6, wherein the drainage hose or channel extends to a position in proximity of the water surface to the filter/purifying plant/separation grate.

8. The fish farming tank according to claim 6, wherein the drainage hose or channel extends on an exterior of the shell.

9. The fish farming tank according to claim 6, wherein the filter/purifying plant/separation grate is arranged in a buoyancy collar.

10. The fish farming tank according to claim 6, the filter/purifying plant/separation grate being arranged in an internal, annular buoyancy volume.

11. The fish farming tank according to claim 1, wherein the outlets are arranged radially straight or vertical outlets, or a combination thereof, which will not contribute to a rotation of water masses in the farming volume.

12. The fish farming tank according to claim 1, with a vertical center column through the farming volume inside the shell.

13. The fish farming tank according to claim 1, with one or more fluid flow generators arranged in the farming volume and designed to create a master flow around a vertical axis in the shell.

14. The fish farming tank according to claim 13, wherein the fluid flow generators are mounted to a vertical center column through the farming volume inside the shell.

15. The fish farming tank according to claim 6, wherein a drainage hose or channel extends internally via the center column to a position in proximity of the water surface to the filter/purifying plant/separation grate in a buoyancy collar.

16. The fish farming tank according to claim 5, wherein a drainage hose or channel extends internally via the center column to a position in proximity of the water surface to the filter/purifying plant/separation grate in an internal, annular buoyancy volume.

17. The fish farming tank according to claim 1, with ballast in a bottom layer, with the one or more inlets pipes through the ballast.

18. The fish farming tank according to claim 4, wherein the pumps are arranged as submerged pumps in the buoyancy collar.

19. The fish farming tank according to claim 5, wherein the pumps are arranged as submerged pumps in the internal, annular buoyancy volume.

20. The fish farming tank according to claim 4, wherein the pumps are arranged with dry-pit pump motors on or in the buoyancy collar.

21. The fish farming tank according to claim 5, wherein the pumps are arranged with dry-pit pump motors on or in the internal, annular buoyancy volume.

22. The fish farming tank according to claim 1, with a size between 100 m$^3$ and 80,000 m$^3$.

23. The fish farming tank according to claim 1, with a size between 2000 m$^3$ and 25,000 m$^3$.

* * * * *